June 8, 1954

J. L. FOLLY

2,680,527

AUTOMATIC TRANSFER MECHANISM

Filed Aug. 14, 1950

INVENTOR
John Lawrence Folly
BY
William A. Zalesak
ATTORNEY

Fig 5

June 8, 1954  J. L. FOLLY  2,680,527
AUTOMATIC TRANSFER MECHANISM
Filed Aug. 14, 1950

INVENTOR
John Lawrence Folly
BY
William A. Zalesak
ATTORNEY

Fig. 12.

Patented June 8, 1954

2,680,527

UNITED STATES PATENT OFFICE 2,680,527

AUTOMATIC TRANSFER MECHANISM

John L. Folly, West Hempfield Township, Lancaster County, Pa., assignor to Radio Corporation of America, a corporation of Delaware Application August 14, 1950, Serial No. 179,187

10 Claims. (Cl. 214—1)

My present invention relates to apparatus useful in the manufacture of articles sensitive to shock and more particularly though not necessarily exclusively to apparatus for automatically moving or transferring cathode ray television receiving tubes from one place to another.

Heretofore, such tubes, commonly referred to as kinescopes, after being evacuated, gettered and sealed off and while still at an elevated temperature, were manually transported to the next station for further processing in the well known manner. In view of the susceptibility of such tubes to implosion when being handled at temperatures ranging from 300–400 degrees C. and the consequent danger to personnel from flying glass, it was desirable to provide apparatus for effecting the transfer which was fully automatic and did not require the presence of any personnel.

A serious obstacle to perfecting such apparatus resided in the requirement that the apparatus be adapted to handle objects having dimensions varying over a wide range. As is well known, picture tubes may vary in size from ones having face plates or viewing screens of approximately 10 inches in diameter or less to ones having a diameter of 19 inches or more. The face plates are preferably a segment of a sphere and may be circular or rectangular in outline. The length of the tubes is also variable. Since the apparatus for evacuating and gettering such tubes is costly and occupies a relatively large area in a manufacturing establishment, it is extremely desirable to operate such equipment at full capacity. To do this, it is necessary that tubes be processed as available and without regard to size. However, up to the present, automatic apparatus for removing the tubes required adjustments to be made thereon for each different sized tube. This, of course, prevented full use of the exhaust apparatus and was otherwise uneconomical and inconvenient.

It is, therefore, a principal object of my invention to provide an automatic transfer mechanism for evacuated glass or composite glass and metal cathode ray tubes; said tubes being at an elevated temperature.

Another object is the provision of such apparatus for automatically transferring glass or composite glass and metal cathode ray tubes having sizes and shapes varying over a wide range.

Still another object is the provision of an automatic apparatus for transferring such tubes while at an elevated temperature and which tensions the exhaust tubulation during the sealing off operation.

A further object is the provision of an apparatus for automatically transferring hot glass or composite glass and metal evacuated cathode ray tubes without introducing thermal strain in the glass thereof.

Further objects and advantages will become evident as my invention is more fully understood.

In the embodiment exemplifying my invention, I preferably utilize a vacuum or suction chuck on an arm which is pivotally mounted on a vertically reciprocable shaft. The direction and speed of the vertical travel of the vacuum chuck arm is controlled by an air jet follow-up hydraulic system control unit. The control unit is arranged to be responsive to a control lever which contacts the face plate of the tube. The vacuum chuck grasps each tube at the face plate and is provided with a heater which maintains it at the temperature of the glass. Except for a switch which initiates the transfer cycle or program, the movement of the chuck and the creation of a partial vacuum therein is controlled by the control lever in engagement with the face plate of the cathode ray tube.

The novel features which I believe to be characteristic of my invention are set forth with particularity in the appended claims. The invention itself will be best understood by reference to the following description taken in connection with the accompanying drawing wherein:

Figure 9 is a view in cross-section of still another form of valve associated with the mechanism referred to;

Figure 2:
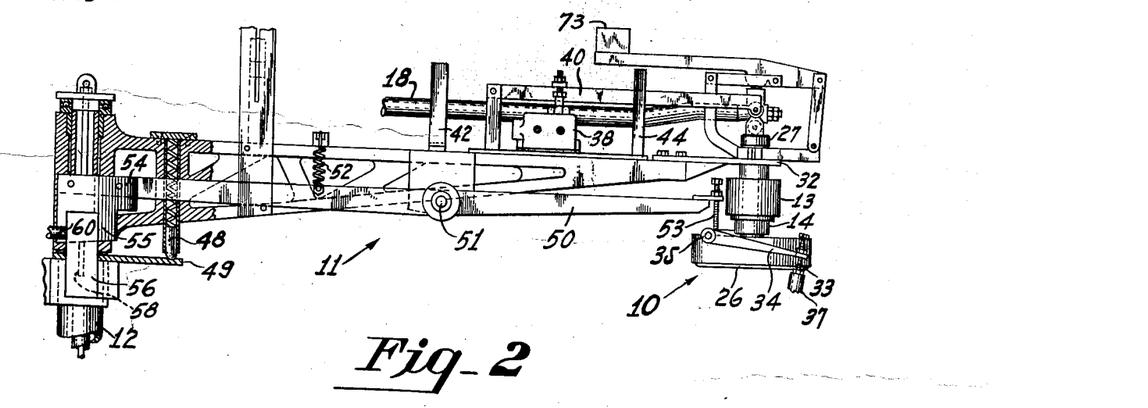
Figure 2 is a side elevational view thereof.
Figure 5:
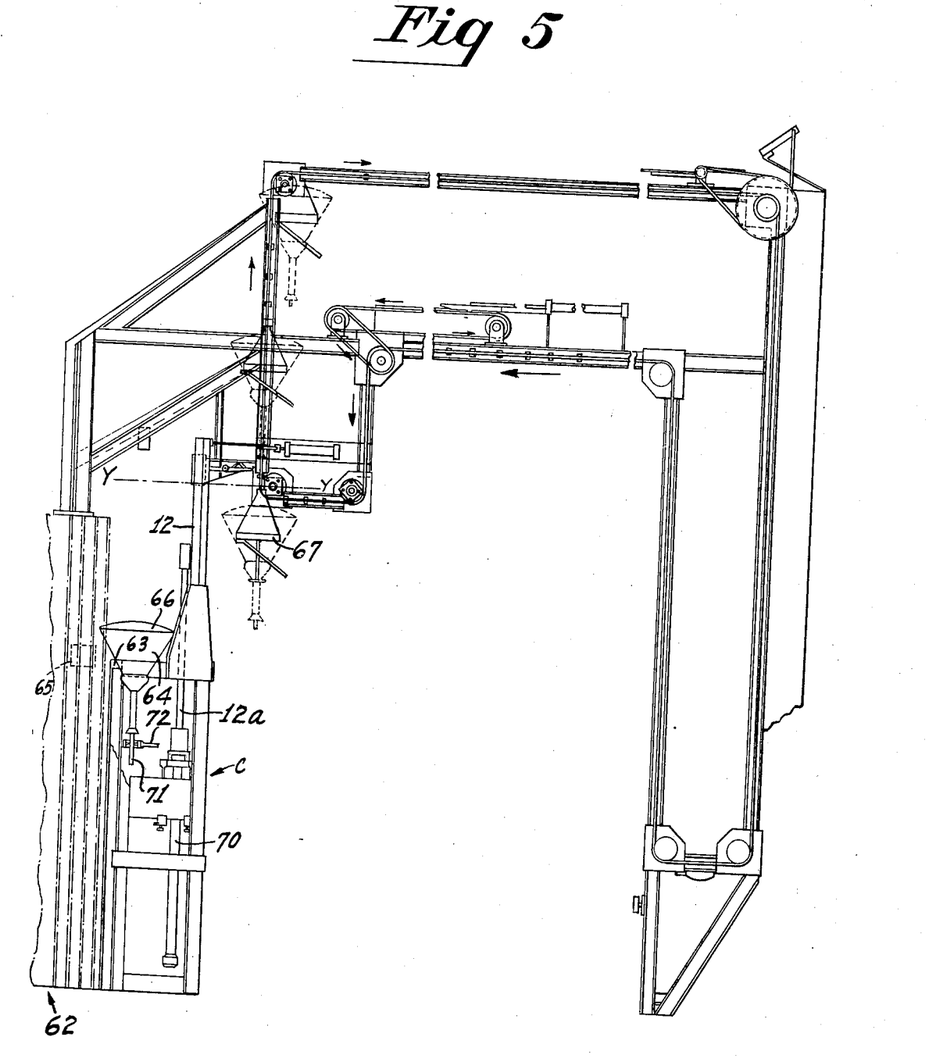
Figures 5 and 6 are, respectively, side and plan views of apparatus shown partially schematically in connection with which my invention is particularly useful.

Referring now to the drawing in detail, a vacuum or suction chuck 10 is connected to the end of an arm or support member 11. Arm or support member 11, as will be more fully pointed out, is rotatably mounted on a vertically movable shaft 12 (Figures 2 and 5).

Figure 4:
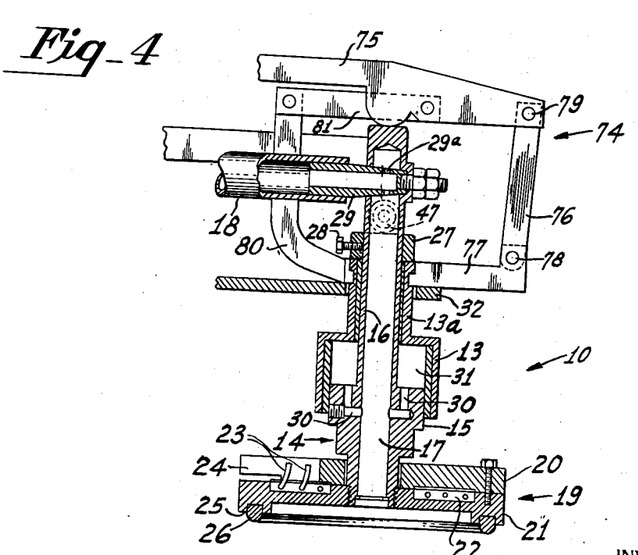
Figure 4 is a sectional view through the line 4—4 of Figure 3.

Vacuum chuck 10, as most clearly shown in Figure 4, comprises an outer casing or cylinder 13 having an upper extension forming a portion of reduced diameter 13a. Interior surfaces of cylinder 13 are provided with Oilite bronze bushings in which is slideably mounted piston 14. Piston 14 extends through cylinder 13 and has portions 15, 16 which snugly fit and are slideable in the larger and smaller bores respectively of cylinder 13. Central passageway 17 of piston 14 communicates at one end with flexible vacuum line 18 through apertures 29a while the other or lower end of piston 14 is connected to annular member 19 which forms the contactor of the vacuum chuck. Annular member 19 is preferably formed of two annular discs 20, 21 which are bolted or otherwise joined in a suitable manner and between them form an annular space 22. Heater wires 23, properly insulated, are mounted in annular space 22 with the terminals therefor extending through access opening 24 formed in upper annular disc 20. The exposed or lower surface of lower annular disc 21 has a peripheral lip 25 with an annular groove formed therein in which is seated gasket 26.

The vacuum chuck is made of metal such as steel and in order to avoid inducing strains in the hot glass of the cathode ray tubes to be contacted, it is provided with a heater as pointed out. The heater maintains the vacuum chuck contactor 19 at the temperature of the tubes to be picked up. Gasket 26 must be made of material having sufficient resilience to make a vacuum seal with the glass face plates while not marking or marring the same even at elevated temperatures. One such material which has been found satisfactory is asbestos.

The upper end of piston 14 extends through the reduced diameter portion 13a of casing 13 and carries a collar 27 which is clamped thereon by set screw 28. Collar 27 limits the downward movement of piston 14 in casing or cylinder 13 and prevents portion 15 of the piston from leaving the large diameter portion of casing or cylinder 13. At its upper end the piston 14 carries the nozzle 29 which through apertures 29a effects the connection between vacuum line 18 and central passageway 17 of piston 14, as aforementioned.

The enlarged portion 15 of piston 14 has passageways 30 formed therein which communicate at one end with central passageway 17 and at the other end with annular space 31 formed between the upper portion 16 of piston 14 and the lower or large diameter portion of casing or cylinder 13.

Vacuum chuck arm or support 11 is provided at its end with an annular perforated disc 32 through which the upper end 13a of cylinder 13 extends. The opening in disc 32 is sufficiently larger than portion 13a to permit the same to readily slide therethrough. As will be seen, casing or cylinder 13 is prevented from sliding through disc 32 by a counterweight linkage to be described.

As most clearly shown in Figure 2, gauge pin 33 is connected to a lever 34 which, in turn, is pivotally connected at 35 to upper annular disc 20. Lever 34 has connected thereto platform 36 which extends sidewards of lever 34 over upper annular disc 20. Gauge pin 33 carries at its lower end a contact tip 37, which, as will be more fully pointed out, contacts the face plate of the tubes being handled and indicates the relative distance of the face plate from gasket 26. Contact pin 37 must be of such material which even at high temperatures will withstand abrasion against the glass face plate and at the same time will in no way mark or mar the glass surface.

Figure 1:
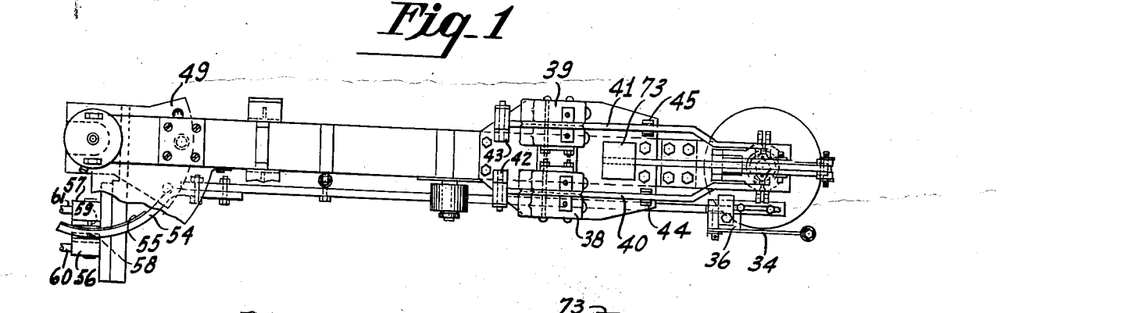
Figure 1 is a plan view of a transfer mechanism constructed in accordance with my invention.
Figures 7, 10, 11:
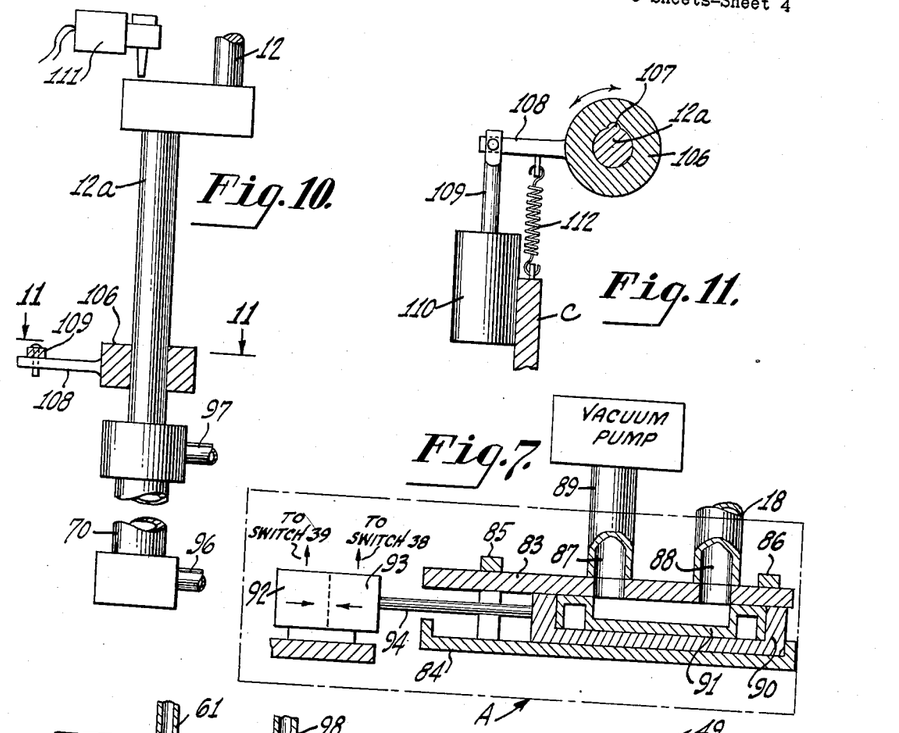
Figure 7 is a view partly in cross-section of a valve that may be used for vacuum control and air flow control in the mechanism of the invention.
Figure 10 is an elevational view of a portion of the mechanism for imparting rotary motion.
Figure 11 is a view partly in cross-section along the line 11—11 of Figure 10.

Flexible vacuum line 18 is connected to a solenoid operated three-way valve "A" shown in Figure 7, the other side of which is connected to a vacuum pump. The three-way valve referred to comprises two space plates 83, 84 fixed to each other by straps 85, 86. The upper plate 83, as viewed in Figure 7, is provided with two openings 87, 88 communicating with ducts 89 and 18 respectively. Between the plates 83, 84 is disposed a slideable valve member including dish-shaped support 90 and valve closing member 91 seated in support 90. Valve closing member 91 has a raised portion 92 which is adapted to assume registry with opening 88 when moved to the left as viewed in Figure 7, to thereby close communication between ducts 18 and 89. Duct 89 is connected to a vacuum pump shown schematically. Therefore, the action of the valve is to open and close communication between the vacuum pump and the duct 18 to thereby selectively actuate the vacuum chuck 10 shown in Figure 2. For moving the valve members 90, 91 to the right and left (Fig. 7) a push-pull solenoid having portion 93 for pulling and portion 92 for pushing is provided. The piston 94 of the solenoid is connected to the slide support 90. The valve referred to is suitably actuated as follows: As most clearly shown in Figures 1, 2, and 12, there are two micro-switches 38 and 39 mounted on vacuum chuck arm or support 11 which are each connected between a source of electrical current (not shown) and each of the solenoid portions referred to which operate the three-way valve described. In the embodiment being described, switch 38 operates solenoid portion 93 which breaks the vacuum while switch 39 is connected to solenoid portion 92 which operates the three-way valve to turn on the vacuum or connect vacuum line 18 to the vacuum pump. Switch levers 40 and 41 each extend respectively over switches 38 and 39. Lever 40 is pivotally connected to post 42 while lever 41 is similarly connected to post 43. Levers 40 and 41 each extend through a guide 44, 45 and carry rollers 46, 47 respectively which overhang collar 27. Roller 47 connected to lever 41 is positioned just above collar 27 while roller 46, for reasons which will be more fully discussed, is located somewhat more distant from collar 27. Thus, when the vacuum chuck contacts the face plate of a tube, piston 14 slides in casing 13 and carries collar 27 with it. This initial movement of collar 27 pivots lever 41 and actuates switch 39. As will be seen, further movement of piston 14 brings collar 27 in contact with roller 46 and, in turn, pivots lever 40 to actuate switch 38.

As was pointed out, vacuum chuck arm or support 11 is pivotally mounted on shaft 12. Arm 11 adjacent shaft 12 is provided with a spring-loaded detent 48 which slides on locator plate 49 and seats in recesses therein which serve to steady arm 11. Main control lever 50 is pivotally connected to arm or support 11 at 51. Spring 52 is connected at one end to arm 11 and at the other end to lever 50 and serves to bias main control lever 50 so that its right hand end (Figure 2) or the end adjacent vacuum chuck 10 is resiliently biased downward. Main control lever 50 carries at its downwardly biased end a contact pin 53 which at all times rests on platform 36 under the action of spring 52.

Figure 8:
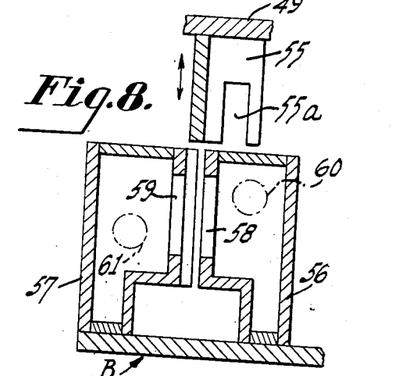
Figure 8 is an enlarged sectional view of another form of valve for air flow control employed in the mechanism of the invention.

At the opposite or upwardly biased end, main control lever 50 has connected thereto an arcuate support member 54 from which depends an air jet control flag 55. As most clearly shown in Figures 2 and 8 flag 55 has a notch 55a formed therein and pivots with vacuum chuck arm 11. Flag 55 is so mounted as to extend between air supply nozzle 56 and air receiving nozzle 57. The two nozzles are spaced approximately one-quarter of an inch apart and are each provided with orifices in the form of elongated slots 58, 59 respectively which extend vertically. I have found that elongated slots eliminate hunting which would otherwise be present with the usual round form of orifice jets. Both slots are ⅞ of an inch long and slot 58 in air supply nozzle 56 is approximately .015 inch wide while slot 59 in air receiving nozzle 57 is narrower and only approximately .010 inch wide. I have found that as the air stream, which is under considerable pressure, leaves air supply nozzle 56, it undergoes considerable turbulence at the edges or fringe thereof. Thus, by decreasing the size of the slot in the receiving nozzle and making it somewhat smaller than the slot in the supply nozzle the turbulent portion of the air stream is cut off and not used and only the non-turbulent center of the air stream is used. Air supply nozzle 56 is connected by conduit 60 to a source of air under pressure through valve A' shown schematically in Figure 12 and which may be similar to the valve A shown within the dot and dash lines in Figure 7. Air receiving nozzle 57 is connected to a conduit 61 which, in turn, is connected to a valve D shown in Figures 9 and 12 which, in turn, controls the movement of a piston 12a (Fig. 5) in hydraulic cylinder 70; the shaft 12 being directly connected to the piston. Such an arrangement is commonly known as an air coupled hydraulic follow-up system. The air jet control system except as modified in accordance with the present invention is known in the trade as an "Askania" hydraulic regulator control unit and is manufactured by the Askania Regulator Company.

Figure 9:
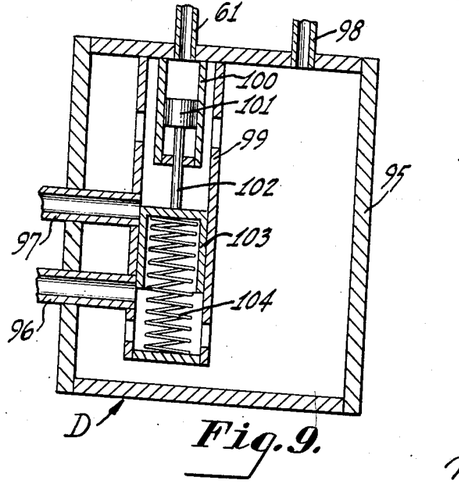
Figure 12:
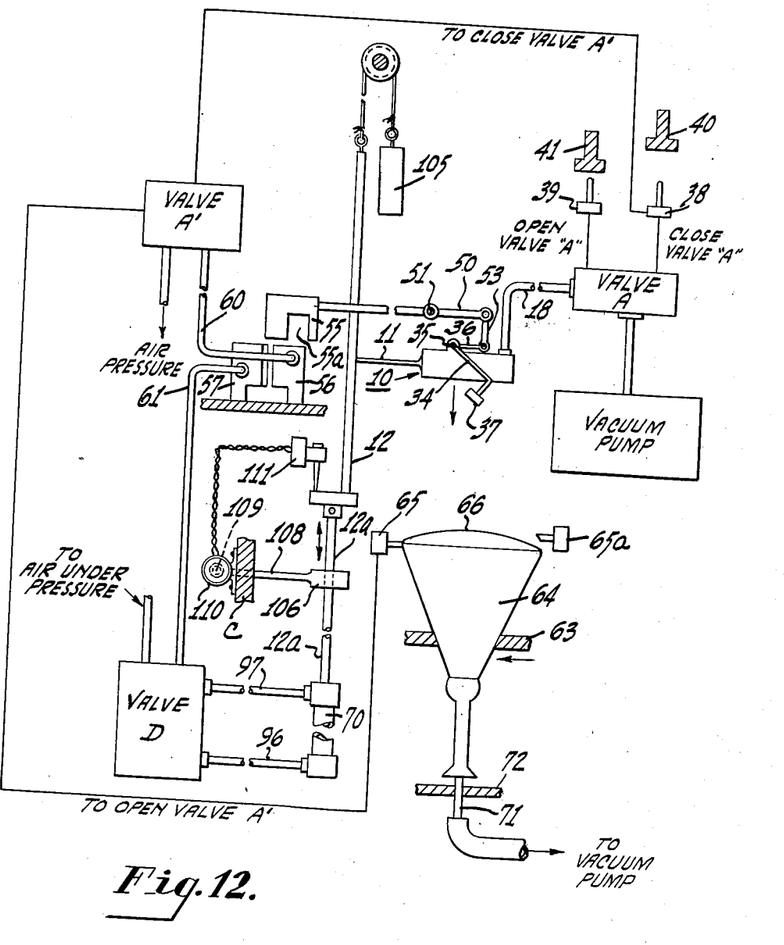
Figure 12 is schematic showing the functional relationship of the several parts of the mechanism.

Referring to the valve D shown in Figure 9 in more detail, it includes a housing 95 through which ducts 96, 97 and 61, 98 extend. As indicated above, duct 61 is connected to air receiving nozzle 57. Duct 98 is connected to a suitable supply of air under pressure. Ducts 97, 96 are connected to the upper and lower portions respectively of cylinder 70 as shown in Figure 12. Within housing 95, is mounted a perforated cylinder 99 which has a plurality of openings, including two openings communicating with ducts 96, 97. Within cylinder 99 is disposed a cylinder 100 in registry with duct 61 and adapted to receive air fed to this duct by nozzle 57. A piston 101 is mounted for axial rectilinear movement in cylinder 100 in response to air pressure transmitted by duct 61. A shaft 102 connects the piston referred to to a cylinder 103 so that this cylinder moves with piston 101. The cylinder 103 is so disposed in cylinder 99 so that it closes one of the openings in cylinder 99 communicating with ducts 96, 97 or partly closes both of these openings. It will be noted that an air thrust on piston 101 will cause the cylinder 103 to move downwardly, as viewed in Figure 9, against the tension of spring 104. The tension of spring 104 is so chosen that when air nozzle 57, is closed by flag 55, the cylinder 103 is urged upwardly to close duct 97 and to open duct 96. When nozzle 57, is half open, the cylinder 103 will assume the position shown in Figure 9 and will leave both ducts 96, 97 partly open. When nozzle 57 is fully open, the force of air flow through duct 61 will cause the cylinder 103 to move fully downwardly to close duct 96 and to open duct 97.

The control unit including nozzles 56, 57 and valve D is so adjusted therefore that when air jet control flag 55 extends half way down between the nozzles or masks one-half of the air supply and receiving orifices, shaft 12 and arm 11 remain vertically stationary. When the orifices or jets are totally covered shaft 12 and arm 11 travel upward at maximum speed. When the receiving orifice is completely opened to the supply orifice, shaft 12 and arm 11 move downward at maximum speed.

To facilitate the upward movement of shaft 12, a counterweight 105 shown in Figure 12 may be employed having a weight greater than the weight of shaft 12 and the assembly supported thereon, for a purpose to be described.

Means for rotating the shaft 12 is shown in Figures 10 and 11. This means includes a collar 106 keyed to shaft 12a by a longitudinal key 107 on the shaft for horizontal movement therealong but fixed against rotation thereon. Arm 108 extends from collar 106 and is linked to piston shaft 109 of a solenoid 110. The solenoid referred to is fixed to a structural element of the framework C of the apparatus shown in Figure 5. A switch 111 actuated successively to closed and opened positions by successive upward movements of shafts 12 and 12a, energizes solenoid 110 to cause the shaft 12 to rotate through a predetermined arc for transporting the tube 64 in an arcuate path, as required during operation of the apparatus with which the mechanism of the invention is associated. Switch 111 is of a type which is actuated to either a closed or opened position by an upward movement of the shaft 12. Thus, energization of solenoid 110 continues during the rotary movement referred to and the succeeding downward movement of shaft 12, and is stopped only when the shaft is raised after the last-mentioned downward movement during which a tube is delivered to a receiving station. When energization of solenoid 110 stops by the last-named upward movement of the shaft 12, the shaft 12 is rotated by the tension of spring 112 so that it assumes its initial angular position.

Figure 6:
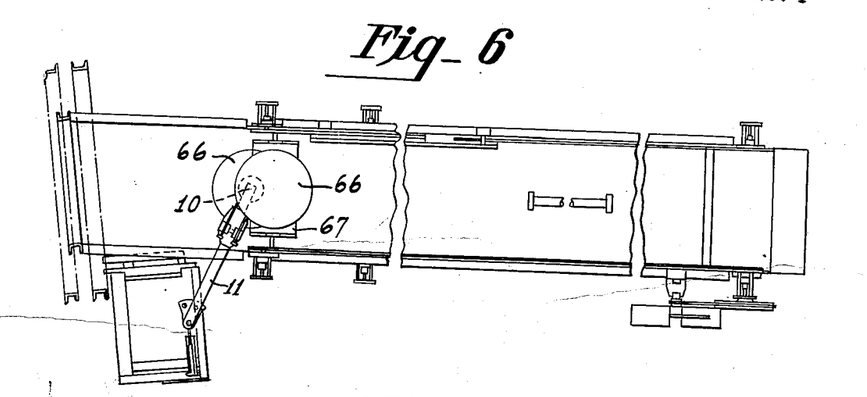

In Figures 5, 6 and 12 there is shown apparatus for handling tubes such as the cathode ray tube previously referred to. Such apparatus includes an exhaust and bake apparatus the extreme end of which is indicated generally at 62. Each tube travels through the apparatus 62 on a cart 63, a portion of which is schematically indicated. Each tube 64 rests in an aperture in the upper surface of one of the carts 63 and travels thereon through apparatus 62. As a cart and tube emerges from apparatus 62 vacuum chuck arm 11 is in its raised position as shown in Figure 12 with the chuck centered over the stopping place of cart 63. As the cart arrives in position below shaft 12 and chuck arm 11, tube 64 actuates a program switch 65 which, in turn, opens the air valve A′ (Figure 12) through which conduit 60 is connected. Since there is no tube connected to the vacuum chuck contact 37, lever 34, platform 36 and contact pin 53 are in their lowermost position while air jet control flag 55 is in its raised position. As a result shaft 12 and vacuum chuck arm 11 travel downwardly. When contact tip 37 comes in contact with the face plate 66 of a tube, lever 34 is pivoted and raises platform 36. Platform 36 being in contact with contact pin 53 raises the same together with the end of main control lever 50. The opposite end of main control lever 50 together with jet control flag 55 travel downward slowing down and finally stopping the downward travel of the arm 11. While lever 34 is being pivoted gasket 26 comes in contact with face plate 66. The apparatus is so adjusted that before the downward travel of vacuum chuck 10 is completely arrested the vacuum chuck contactor 19 and piston 14 are moved somewhat upward with respect to casing or cylinder 13. Collar 27 also moves upwardly with piston 14 and in so doing moves roller 47 upward pivoting lever 41 to actuate micro-switch 39. Micro-switch 39 actuates solenoid portion 92 which, in turn, shifts the three-way valve A to open vacuum line 18 to the vacuum pump. This creates a vacuum in central passageway 17 and the space formed between lower disc 21, gasket 26 and face plate 66. A vacuum is also created in annular space 31 which exerts an upward pull on the enlarged portion 15 of piston 14. This causes an initial upward movement of piston 14 and tube 64 which removes all of the vertical free play in the mounting of tube 64 in cart 63. As indicated in Figures 5 and 12, tube 64 has a metal exhaust tubulation 71 which rigidly interconnects tube 64 and a vacuum pump (not shown) on cart 63. The upward pull exerted on portion 15 of piston 14 is transmitted to exhaust tubulation 71 which, after elimination of the vertical free play, prevents upward movement of tube 64 with the result that the exhaust tubulation is under tension. Now the pinch off mechanism indicated generally at 72 is actuated and severs exhaust tubulation 71 by pinching the tubing off and effecting a seal as shown and described in Patent No. 2,427,597, Garner et al. Pinch off mechanism 72 is in the form of a heavy pincher having opposed movable jaws which come together when the mechanism is actuated. The movable jaws exert sufficient force upon the metal exhaust tubulation to cause plastic flow or cold extrusion of the metal therebetween. As a result it is desirable that the exhaust tubulation be under tension at the time the pinch off is effected in order to take up elongation in the tubing which takes place during the pinch off. Also the vacuum in annular space 31 prevents the pinched off tubing from coming together after the pinch off is effected and thereby damaging the seal.

The pinch off mechanism by a suitable arrangement (not shown) automatically moves into operating position when a cart 63 arrives in the position shown in Figure 5. The initial upward movement of tube 64 as piston 14 is drawn upward a short distance in casing 13 is utilized to actuate micro-switch 65a shown in Figure 12 which, in turn, actuates the pinch-off mechanism.

As soon as the pinch off is effected, piston 14 is drawn further up into casing or cylinder 13. Platform 36 being connected to vacuum chuck contactor 19 and piston 14 also moves upwardly against contact pin 53 and further pivots main control lever 50. As main control lever 50 is further pivoted, jet control flag 55 travels further downward between the air supply nozzle 56 and air receiving nozzle 57 until the air receiving nozzle is completely masked from the air supply nozzle. At this time, shaft 12 with arm or support member 11 thereon travels upwardly at maximum speed and comes to rest automatically under the action of the hydraulic piston and cylinder 70 in its upward position. The vacuum chuck arm 11 is then rotated as shown in Figure 11 until it comes to rest in the position shown in Figure 6 by some suitable means such as is shown in Figures 10 and 11, or by a pneumatic cylinder, the movement of which is initiated by switch 111 which is tripped by shaft 12 when the arm completes its upward travel. When the arm rotates, air jet control flag 55 is also rotated and the notched portion 55a thereof comes between nozzles 56 and 57 thereby uncovering the air receiving nozzle 57. Arm 11 then travels downwardly and the tube is seated in a carrier 67 as shown in Figure 5. When the tube comes to rest in the carrier, casing or cylinder 13 is driven upwards with respect to plate 32. This causes main control lever 50 to pivot and the jet control flag is brought downward until it covers half of air receiving nozzle 57. This stops the downward travel vacuum chuck arm and shaft 12. At the same time collar 27 is carried upward against roller 46 and causes lever 40 to pivot thereby actuating micro-switch 38. As was pointed out, micro-switch 38 is connected to solenoid portion 93 which actuates the valve in the vacuum line to break the vacuum. Tube 64 has thus been deposited in the carrier. Micro-switch 38 is also connected to valve A′ so as to shut off the air supply to the air conduit 60 and air supply nozzle 56. Thus, shaft 12 and arm 11 are raised to the topmost position by counterweight 105 and the arm is rotated back toward the starting position by the tension of spring 112 (Figure 11).

Figure 3:
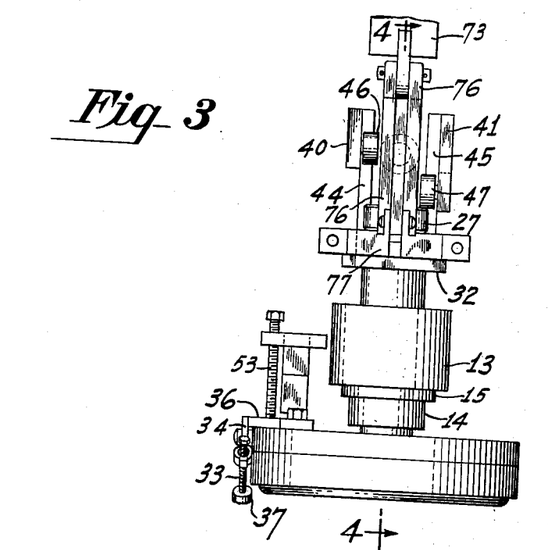
Figure 3 is a front view thereof.

As pointed out hereinabove, creation of vacuum in annular space 31 exerts an upward pull on piston 14 and serves to tension exhaust tubulation 71 of tube 64. Counterweight 73 together with the linkage indicated generally at 74 provides an extremely convenient way of controlling the amount of tension exerted on the exhaust tubulation. Lever 75 serves to support counterweight 73; the latter being slideably mounted thereon and secured in any desired position by means of a set screw not shown. Links 76, 77 are pivotally connected together at 78 while link 76 is pivotally connected to lever 75 at 79. As most clearly shown in Figure 3, lever 75 has connected to it two links 76 which, in turn, are connected to two links 77. Links 77 are rigidly interconnected around the uppermost portion of casing or cylinder 13 below collar 27. Rigidly connected to links 77 are a pair of links 80. Links 80 are pivotally connected to links 81 which are, in turn, pivotally connected to lever 75. As shown the linkage transmits the thrust of counterweight 73 to the upper end of piston 14. The arrangement is such that the thrust is transmitted along the axis of piston 14 and in a vertical direction, thus eliminating any possibility of the piston binding in casing or cylinder 13. By shifting counterweight 73 from left to right on lever 75, the force transmitted by the linkage to piston 14 is varied. Since this force is in the direction opposite to the force developed by the vacuum in annular space 31, the total upward force on piston 14 may thereby be regulated or adjusted.

It is apparent from the foregoing that I have provided a novel apparatus for automatically handling and transferring glass and composite glass and metal articles at elevated temperatures without inducing strains therein. Furthermore, I have provided such apparatus which is fully automatic in operation and does not require the attention of any personnel. Such apparatus has proven highly effective in use and has reduced the number of tube failures from implosion which occurred when the tubes were manually handled. Furthermore, my apparatus is capable of handling devices which vary widely in length and width or diameter. It is further apparent that variations may be made in the apparatus shown as illustrative of my invention which will be within the spirit of my invention and the scope of the appended claims. It is intended to cover all such variations.

I claim:

1. An automatic mechanism for transferring objects, comprising an arm, means connected to said arm for moving and returning the same, a casing supported by said arm, a piston movable in said casing and having a passageway formed therein, a contractor for contacting said objects connected to said piston, said passageway communicating with the atmosphere through said contactor, said piston being adapted to be connected to means for reducing the pressure in said passageway below that of the atmosphere, means on said arm responsive to the position of said piston for controlling said first mentioned means, and means on said arm actuated by said piston for controlling said second mentioned means.

2. An automatic mechanism for transferring objects, comprising an arm, means connected to said arm for moving and returning the same, a cylindrical casing supported by said arm and movable with respect thereto, a piston movably mounted in said casing and having a passageway formed therein, a contactor for contacting said objects connected to said piston, said passageway communicating with the atmosphere through said contactor and adapted to be closed when said contactor engages one of said objects, said piston being adapted to be connected to means for reducing the pressure in said passageway below that of the atmosphere, means on said arm responsive to the position of said piston for controlling said first mentioned means, and means on said arm actuated by said piston for controlling said second mentioned means.

3. An automatic mechanism for transferring objects, comprising a cylinder, a piston reciprocable in said cylinder, an arm connected at one end thereof to said piston and movable therewith, a vacuum chuck supported from the other end of said arm and movable therewith, said vacuum chuck including a casing and a vacuum chuck piston movably mounted in said casing and extending therethrough, said vacuum chuck having a passageway formed therethrough and adapted to engage one of said objects and close one end of said passageway, said vacuum chuck further being adapted to connect the other end of said passageway to means for reducing the pressure in said passageway below that of the atmosphere when said one end thereof is closed by an object, an air supply jet supported on said first mentioned piston, movable therewith and adjacent said one end of said arm, an air receiving jet also supported on said piston in close spaced relation and opposed to the air supply jet, a control lever pivotally mounted on said arm and having one end engaging said vacuum chuck piston and movable therewith, resilient means biasing said control lever against said vacuum chuck piston whereby said lever pivots when said vacuum chuck piston moves, and a control flag connected to the other end of said control lever and movable therewith, said control flag being movable into and out of the space between said jets.

4. An automatic mechanism for transferring objects, comprising an arm, means connected to said arm for moving and returning the same, an open ended casing having an enlarged portion and supported by said arm, a piston extending through said casing and movable therein, said piston having an enlarged portion movable in and closing the enlarged portion of said casing, the enlarged portions of said casing and piston forming an annular space about said piston, said piston having a passageway formed therein, a contactor connected to one end of said piston and movable therewith, one end of said passageway communicating with the atmosphere through said contactor, said piston being adapted to connect the other end of said passageway to means for reducing the pressure therein below that of the atmosphere, said passageway also communicating with said annular space, a control lever pivotally connected to said arm and having an end adjacent said contactor, resilient means biasing said end of said control lever against said contactor, a control flag connected to the other end of said lever, a pair of opposed spaced air jets supported by said first mentioned means and consisting of an air supply jet and an air receiving jet, said air jets being adapted to be connected to valve means for controlling said first mentioned means, said valve means being responsive to the amount of air delivered to the air receiving jet by the air supply jet, said control flag being movable into and out of the space between said air jets when said lever is actuated by said contactor, and means on said arm actuated by said piston for controlling the means for reducing the pressure in said passageway and annular space.

5. An automatic mechanism for transferring objects, comprising a movably mounted shaft, means for moving said shaft, an arm supported adjacent one end thereof by said shaft and movable therewith, a casing supported by said arm adjacent the other end thereof, a piston movable in said casing and extending therethrough, said piston having a passageway formed therein and communicating with the atmosphere through one end of said piston, a contactor connected to said one end of said piston, the other end of the piston being adapted to be connected to means for reducing the pressure in said passageway below that of the atmosphere, a control lever pivotally mounted on said arm and having one end adjacent said contactor, means pivotally mounted on said contactor in engagement with said control lever and normally extending beyond said contactor, resilient means biasing said control lever and urging said one end thereof against said last mentioned means, an air supply jet having a supply orifice formed therein and mounted on said shaft, an air receiving jet mounted on said shaft and having a receiving orifice formed therein, said receiving orifice being opposed to and spaced from said supply orifice, a control flag supported from the other end of said control lever and movable into and out of the space between said orifices, switch means mounted on said arm and adapted to control said means for reducing the pressure in said passageway, and means on said arm responsive to movement of said piston for actuating said switch means.

6. An automatic mechanism for transferring objects according to claim 5 and wherein said air supply jet and said air receiving jet each have an elongated orifice, the orifice of said air supply jet being larger than the orifice in said air receiving jet.

7. An automatic mechanism for transferring objects according to claim 5 and wherein each of said air supply jet and said air receiving jet have an elongated orifice formed therein, the orifice in said air supply jet being wider than the orifice in said air receiving jet.

8. A vacuum chuck, comprising a cylindrical casing having an enlarged portion, a piston movable in said casing and extending therethrough, said piston having an enlarged portion movable in the enlarged portion of said casing and forming therewith an enclosed annular space, a passageway formed in said piston and communicating with the atmosphere through one end of said piston, said passageway communicating with said annular space, said piston being adapted to connect said passageway and annular space to means for reducing the pressure therein below that of the atmosphere, a contactor connected to said piston and having a recess in one surface thereof forming an extension of said passageway and adapted to be closed by one of said objects, a lever pivotally connected to said contactor, and a contact pin connected to said lever and normally extending beyond said one surface of said contactor.

9. A vacuum chuck, comprising a cylindrical casing having an enlarged diameter portion, a piston movable in said casing and extending therethrough, a collar connected to said piston on one side of said casing for limiting the movement of said piston through said casing, said piston having an enlarged diameter portion movable in and closing the enlarged diameter portion of said casing, said enlarged portions forming an enclosed annular space, said piston having a passageway formed therein communicating with said annular space and with the atmosphere at one end of said piston, said piston being adapted adjacent its other end to connect said passageway to means for reducing the pressure in said passageway and annular space below that of the atmosphere, a contactor connected to said one end of said piston and having a recess formed in one surface thereof forming an extension of said passageway and adapted to be closed by one of said objects, said contactor having an annular chamber formed therein, and means in said chamber for heating the same.

10. A vacuum chuck, comprising a cylindrical casing having an enlarged portion, a piston vertically movable in said casing and extending therethrough, said piston having an enlarged portion movable in the enlarged portion of said casing and forming therewith an enclosed annular space, a passageway formed in said piston and communicating with the atmosphere through one end of said piston, said passageway communicating with said annular space, said piston being adapted to connect said passageway and annular space to means for reducing the pressure therein below that of the atmosphere, a contactor connected to said piston and having a recess in one surface thereof forming an extension of said passageway and adapted to be closed by one of said objects, a lever pivotally connected to said contactor, a contact pin connected to said lever and normally extending beyond said one surface of said contactor, a counterweight lever connected to the upper end of said casing and having a bearing surface engaging the upper end of said piston, and a counterweight movably mounted on said lever.

References Cited in the file of this patent
UNITED STATES PATENTS

| Number | Name | Date |
|---|---|---|
| 2,359,433 | McNamara | Oct. 3, 1944 |
| 2,380,306 | Hallowell, Jr. | July 10, 1945 |
| 2,397,448 | Todd | Mar. 26, 1946 |
| 2,408,603 | Braithwaite et al. | Oct. 1, 1946 |